(12) United States Patent
Kizaki

(10) Patent No.: US 11,254,385 B2
(45) Date of Patent: Feb. 22, 2022

(54) HEADLIGHT DEVICE

(71) Applicant: HONDA MOTOR CO., LTD., Tokyo (JP)

(72) Inventor: Tokujiro Kizaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 615 days.

(21) Appl. No.: 16/321,630

(22) PCT Filed: Aug. 30, 2017

(86) PCT No.: PCT/JP2017/031175
§ 371 (c)(1),
(2) Date: Jan. 29, 2019

(87) PCT Pub. No.: WO2018/051790
PCT Pub. Date: Mar. 22, 2018

(65) Prior Publication Data
US 2021/0009225 A1 Jan. 14, 2021

(30) Foreign Application Priority Data

Sep. 13, 2016 (JP) .............................. JP2016-178809

(51) Int. Cl.
*B62J 6/026* (2020.01)
*B62J 6/024* (2020.01)
(Continued)

(52) U.S. Cl.
CPC ............... *B62J 6/026* (2020.02); *B62J 6/024* (2020.02); *F21S 41/148* (2018.01); *F21S 41/151* (2018.01)

(58) Field of Classification Search
CPC .......... B62J 6/024; B62J 6/026; F21S 41/148; F21S 41/151
See application file for complete search history.

(56) References Cited

U.S. PATENT DOCUMENTS 9,441,804 B2   9/2016 Oguchi et al.
2006/0028814 A1* 2/2006 Smith .................... F21K 9/232
                                                    362/227
(Continued)

FOREIGN PATENT DOCUMENTS

DE   102010046571   * 9/2010   ............... B60Q 1/04
DE   102015203857 A1   10/2015
(Continued)

OTHER PUBLICATIONS

International Search Report (PCT/ISA/210) issued in PCT/JP2017/031175, dated Dec. 5, 2017.
(Continued)

*Primary Examiner* — Zheng Song
(74) *Attorney, Agent, or Firm* — Birch, Stewart, Kolasch & Birch, LLP

(57) ABSTRACT

A headlight device includes a first light source for high beam, a second light source for low beam and a third light source for low beam. In the headlight device, the second light source and the third light source are disposed on opposite sides of the first light source so as to sandwich the first light source therebetween. Thus, it is possible to provide a headlight device for which the entirety can be made to appear bright.

6 Claims, 7 Drawing Sheets

(51) Int. Cl.
  *F21S 41/148*    (2018.01)
  *F21S 41/151*    (2018.01)

(56)         References Cited

U.S. PATENT DOCUMENTS

2010/0328963 A1    12/2010  Miyagawa
2013/0265793 A1*   10/2013  Helbig .................... F21S 41/24
                                                    362/538
2019/0110348 A1*    4/2019  Feil ........................ F21S 43/14

FOREIGN PATENT DOCUMENTS

DE      202019000458    *  1/2019   .............. B62J 6/026
JP       2002-216509 A     8/2002
JP       2011-014300 A     1/2011
JP          5969218    *  2/2012   ................ F21S 8/10
JP       2013-177104 A     9/2013
JP       2013-178904 A     9/2013
JP     WO 2020/039890  *  8/2018   ............ F21S 41/143
JP     WO 2020/105516  * 11/2018   ............ F21S 41/143

OTHER PUBLICATIONS

Geman Office Action, dated Jun. 9, 2020, for German Application No. 112017004600.9, with an English translation.

* cited by examiner

HEADLIGHT DEVICE

TECHNICAL FIELD

The present invention relates to a headlight device.

BACKGROUND ART

Patent Document 1 discloses a headlight device. The headlight device has its low beam and high beam disposed vertically.

RELATED ART DOCUMENTS

Patent Documents

Patent Document 1: Japanese Patent Application Laid-open No. 2013-177104

SUMMARY OF THE INVENTION

Problems to be Solved by the Invention

When only the low beam of the present device is turned on, since the light-emitting region of the high beam is dark, compared with a time when both beams are turned on, the light-emitting area is decreased. Making the entire headlight appear bright is an issue.

The present invention has been accomplished in light of the above circumstances, and it is an object thereof to provide a headlight device for which the entirety can be made to appear bright.

Means for Solving the Problems

According to a first aspect of the present invention, there is provided a headlight device having a first light source for high beam, a second light source for low beam and a third light source for low beam, characterized in that the second light source and the third light source are disposed on opposite sides of the first light source so as to sandwich the first light source therebetween.

According to a second aspect of the present invention in addition to the first aspect, the headlight device has no light source for low beam on a straight line that orthogonally intersects a straight line joining the second light source and the third light source, and passes through the center of the second light source and the third light source.

According to a third aspect of the present invention, in addition to the first or second aspect, an illumination opening via which outgoing light from at least one of the second light source and the third light source is emitted is formed so as to follow an external shape of the headlight device.

According to a fourth aspect of the present invention, in addition to the third aspect, the headlight device comprises a fourth light source for low beam, and an illumination opening via which outgoing light from the fourth light source is emitted is formed so as to follow the external shape of the headlight device on a side opposite to the third light source.

According to a fifth aspect of the present invention, in addition to any one of the first to fourth aspects, the headlight device has one lens.

Effects of the Invention

In accordance with the first aspect, it is possible to make the entire headlight appear bright.

In accordance with the second aspect, it is possible to make the entire headlight appear bright with a small number of light sources.

In accordance with the third aspect, it is possible to make the entire headlight appear bright more effectively.

In accordance with the fourth aspect, it is possible to make the entire headlight appear bright more effectively.

In accordance with the fifth aspect, due to a common lens being used it becomes possible to also make a portion other than a part that is illuminated appear bright.

EXPLANATION OF REFERENCE NUMERALS AND SYMBOLS

Figure 1:
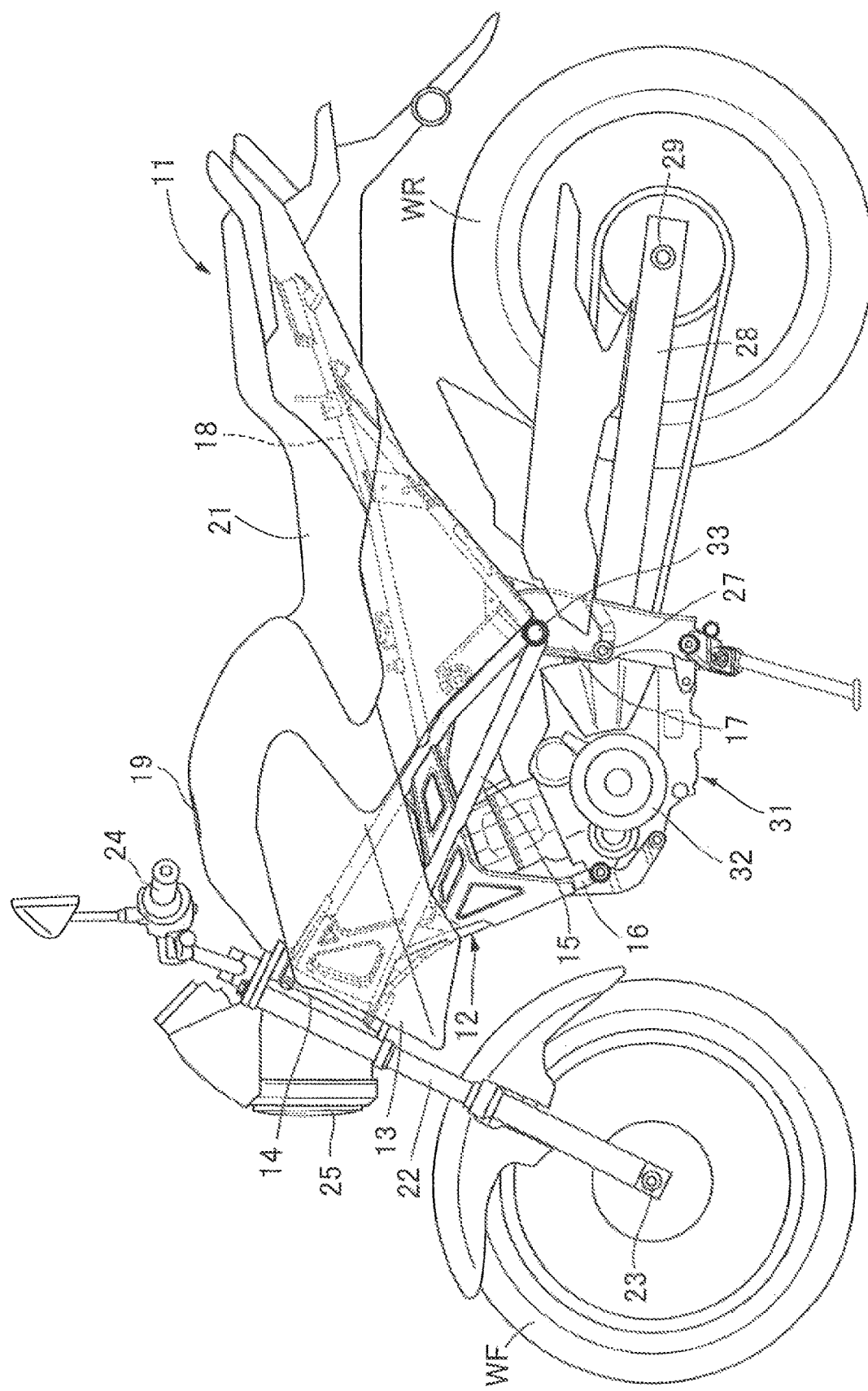
FIG. 1 is a side view schematically showing an overall picture of a saddle-ridden vehicle, that is, a two-wheeled motor vehicle, related to one embodiment. (first embodiment)

25 Headlight device
35 Lens
52 Illumination opening (first auxiliary illumination opening)
53 Illumination opening (second auxiliary illumination opening)
58 First light source
59 Second light source
63 Third light source
65 Fourth light source
66 Straight line (joining second light source and third light source)

MODES FOR CARRYING OUT THE INVENTION

One embodiment of the present invention is explained below by reference to the attached drawings.

First Embodiment

FIG. 1 schematically shows an overall picture of a saddle-ridden vehicle, that is, a two-wheeled motor vehicle, related to one embodiment. The two-wheeled motor vehicle 11 includes a vehicle body frame 12 and a vehicle body cover 13 that partially covers the vehicle body frame 12. The vehicle body frame 12 has a head pipe 14, a pair of left and right main frames 15 extending from the head pipe 14 downward to the rear, a pair of left and right down frames 16 extending from the head pipe 14 downward to the rear beneath the main frame 15, a pair of left and right pivot frames 17 joined to the rear end of the respective main frame 15 and extending downward, and a pair of left and right seat frames 18 extending from the respective main frame 15 upward to the rear. An occupant seat 21 is mounted on the seat frame 18 to the rear of a fuel tank 19. The fuel tank 19 is covered by the vehicle body cover 13. The vehicle body cover 13 is molded from for example a resin material.

A front fork 22 is steerably supported on the head pipe 14. A front wheel WF is supported on the front fork 22 so that it can rotate around an axle 23. Handlebars 24 are linked to the upper end of the front fork 22. A headlight device 25 is fixed to the handlebars 24 in front of the head pipe 14.

A swing arm 28 is linked to the vehicle body frame 12 in the rear of the vehicle so that it can swing vertically around a pivot 27. A rear wheel WR is supported at the rear end of the swing arm 28 so that it can rotate around an axle 29. An internal combustion engine unit 31 is mounted on the vehicle body frame 12 between the front wheel WF and the rear wheel WR. The internal combustion engine unit 31 includes an internal combustion engine 32 that generates a driving force transmitted to the rear wheel WR.

The lower end of the main frame 15 is linked to a rear side of the internal combustion engine 32, and the lower end of the down frame 16 is linked to a front side of the internal combustion engine 32. Thus, a rigid structure is established by means of the internal combustion engine 32 in addition to the main frame 15 and the down frame 16. The left and right pivot frames 17 are linked to each other via a cross tube 33 extending in the horizontal direction. The pivot 27 is supported on the pivot frame 17.

Figure 2:
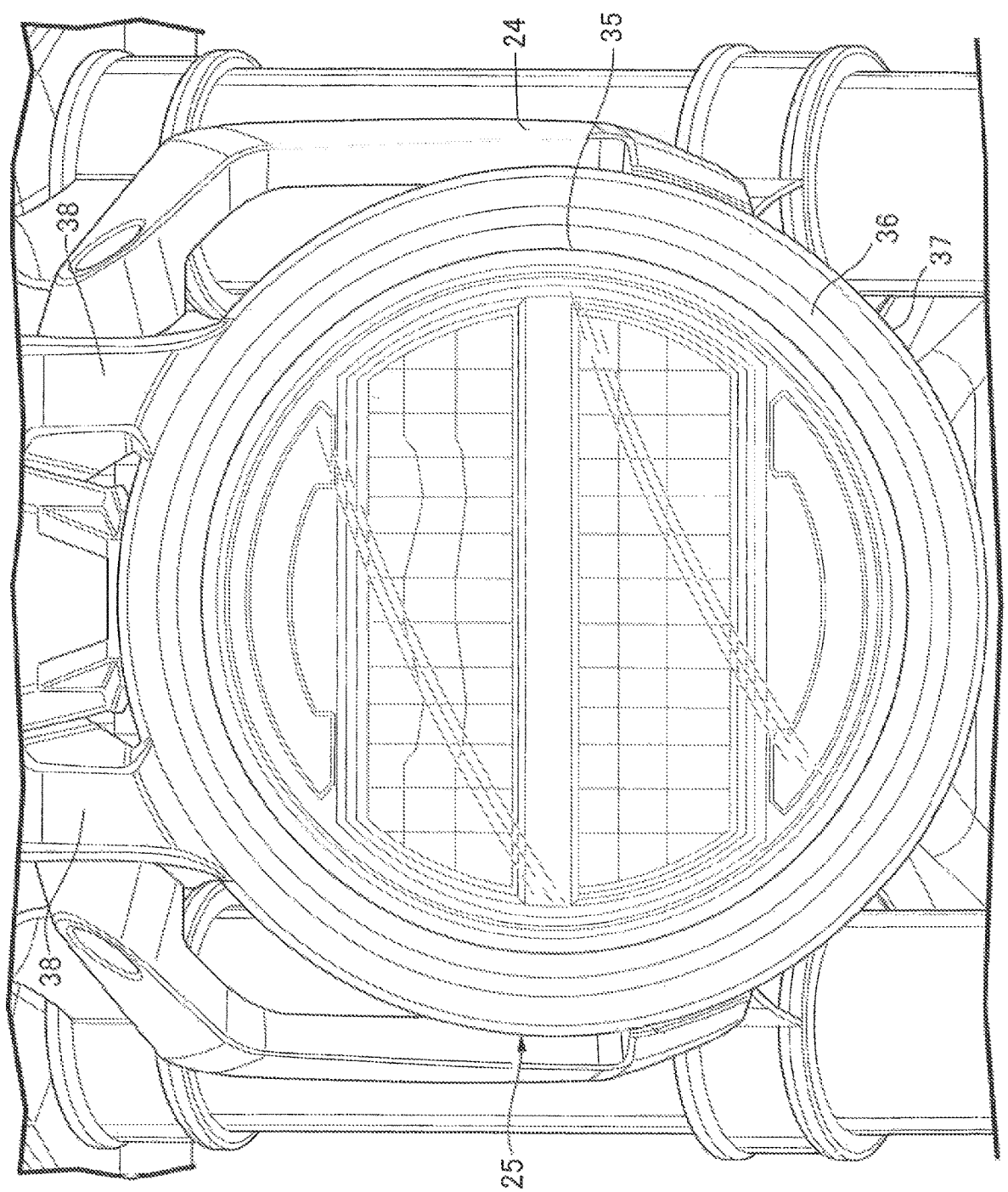
FIG. 2 is an enlarged front view showing the appearance of a headlight device. (first embodiment)

As shown in FIG. 2, the headlight device 25 includes a frame body 36 supporting a transparent lens 35 by surrounding the outer periphery of the lens 35. Here, the outline of the lens 35 is formed as a circular shape. The frame body 36 is formed into a ring shape that receives the outer periphery of the lens 35. The lens 35 and the frame body 36 are coaxially disposed. The frame body 36 fixes the lens 35 to a housing 37. Provided integrally with the housing 37 is a bracket 38 linked to the handlebars 24.

Figure 3:
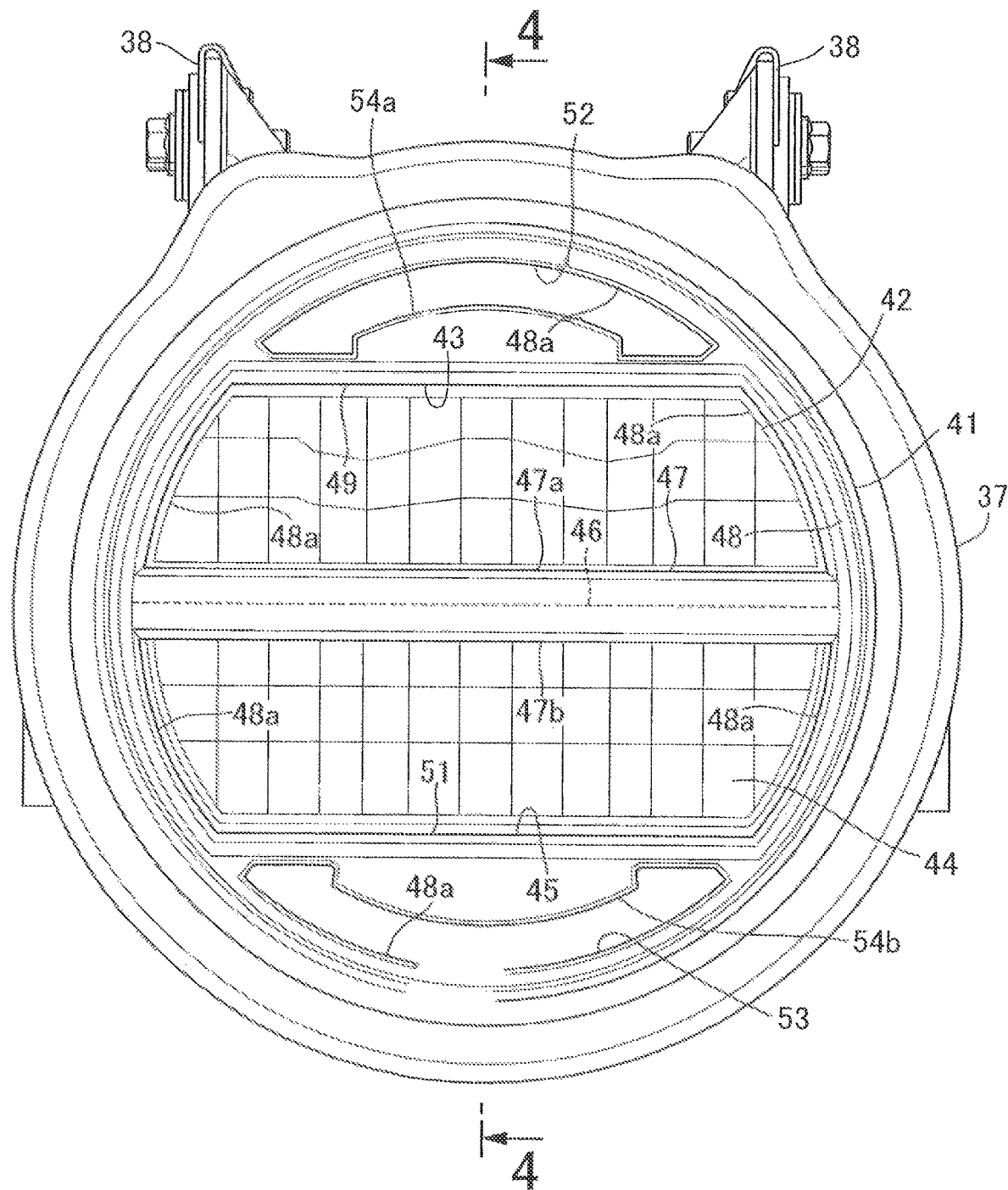
FIG. 3 is an enlarged front view schematically showing the structure of a frame inside a lens. (first embodiment)

As shown in FIG. 3, a light-impermeable frame 41 is housed in a cylindrical body of the housing 37 inside the lens 35. The frame 41 is fitted into an opening of the housing 37. The frame 41 is molded from for example a metal material. The frame 41 defines a first illumination opening 43 that defines an illumination range for light from a first reflector 42 for low beam and a second illumination opening 45 that defines an illumination range for light from a second reflector 44 for high beam. The first illumination opening 43 and the second illumination opening 45 are separated from each other by means of a long center frame 47 extending along one diameter line 46. The center frame 47 is partitioned by means of border lines 47a and 47b parallel to the one diameter line 46, which is horizontal. Opposite ends of the center frame 47 are linked to an annular body 48 that is continuous along the inner periphery of the cylindrical body.

The lower edge of the first illumination opening 43 is partitioned by means of the border line 47a of the center frame 47. The upper edge of the first illumination opening 43 is partitioned by means of a segment 49 that is parallel to the one diameter line 46. Opposite ends of the upper edge and opposite ends of the lower edge are connected to each other via an inner edge 48a of the annular body 48. The inner edge 48a of the annular body 48 is partitioned by means of a partial circle that is concentric with the outline of the lens 35.

Similarly, the upper edge of the second illumination opening 45 is partitioned by means of the border line 47b of the center frame 47. The lower edge of the second illumination opening 45 is partitioned by means of a segment 51 that is parallel to the one diameter line 46. Opposite ends of the lower edge and opposite ends of the upper edge are connected to each other via the inner edge 48a of the annular body 48. The inner edge 48a of the annular body 48 is partitioned by means of a partial circle that is concentric with the outline of the lens 35.

The frame 41 defines a first auxiliary illumination opening 52 that extends along the inner edge 48a of the annular body 48 above the first illumination opening 43 and a second auxiliary illumination opening 53 that extends along the inner edge 48a of the annular body 48 beneath the second illumination opening 45. The first auxiliary illumination opening 52 defines an illumination range for light from an auxiliary light source that is hidden behind the first reflector 42. The second auxiliary illumination opening 53 defines an illumination range for light from an auxiliary light source that is hidden behind the second reflector 44. Here, the upper edge of the first auxiliary illumination opening 52 is partitioned by means of the inner edge 48a of the annular body 48, and the lower edge of the first auxiliary illumination opening 52 is partitioned by means of an arc 54a that is concentric with the annular body 48. Therefore, the first auxiliary illumination opening 52 extends in an arc shape with a uniform width. Similarly, the lower edge of the second auxiliary illumination opening 53 is partitioned by means of the inner edge 48a of the annular body 48, and the upper edge of the second auxiliary illumination opening 53 is partitioned by means of an arc 54b that is concentric with the annular body 48. Therefore, the second auxiliary illumination opening 53 extends in an arc shape with a uniform width.

Figure 4:
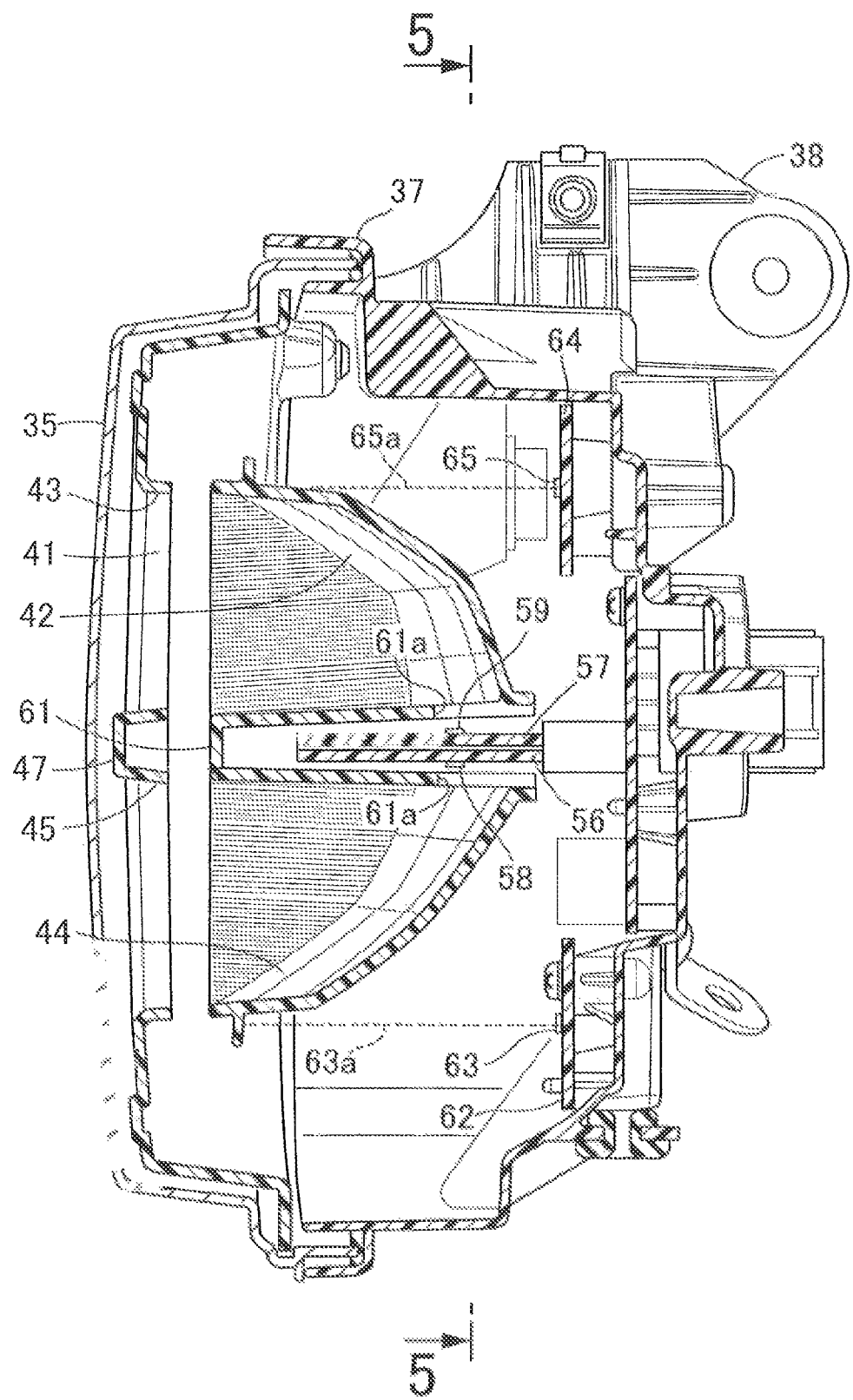
FIG. 4 is a sectional view along line 4-4 in FIG. 3. (first embodiment)

As shown in FIG. 4, a first board 56 and a second board 57, which are in a horizontal attitude, are fixed to the housing 37 on the reverse side of the center frame 47. A lower face of the first board 56 opposes the second reflector 44. A first light source 58 for high beam is mounted on the lower face of the first board 56. The first light source 58 is formed from for example a surface-emitting LED device having directivity in the vertical direction of the board. The second reflector 44 reflects light from the first light source 58 toward the second illumination opening 45. Light is emitted forward from the second illumination opening 45. Similarly, an upper face of the second board 57 opposes the first reflector 42. A second light source 59 for low beam is mounted on the upper face of the second board 57. The second light source 59 is formed from for example a surface-emitting LED device having directivity in the vertical direction of the board. The first reflector 42 reflects light from the second light source 59 toward the first illumination opening 43. Light is emitted forward from the first illumination opening 43.

The first board 56 and the second board 57 are partially housed in an enclosure 61. The enclosure 61 is molded from a light-impermeable material. A rear edge 61a of the enclosure 61 is partitioned by a light path defined from the first light source 58 and the second light source 59 in the vertical direction on the first illumination opening 43 and second illumination opening 45 side respectively. Light that is inclined with respect to the vertical direction from the first light source 58 toward the second illumination opening 45 is shielded by means of the enclosure 61. Similarly, light that is inclined with respect to the vertical direction from the second light source 59 to the first illumination opening 43 is shielded by means of the enclosure 61.

A third board 62 in a vertical attitude is fixed to the housing 37 to the rear of the second reflector 44. A third light source 63 for low beam is mounted on the surface of the third board 62. The third light source 63 is formed from for example a surface-emitting LED device having directivity in the vertical direction of the board. A light path 63a of the third light source 63 intersects the second reflector 44. Outgoing light in the vertical direction of the board from the third light source 63 is shielded by means of the second reflector 44. The light is diffused within the housing 37. The diffused light leaks forward from the second auxiliary illumination opening 53.

Similarly, a fourth board 64 in a vertical attitude is fixed to the housing 37 to the rear of the first reflector 42. A fourth light source 65 for low beam is mounted on the surface of the fourth board 64. The fourth light source 65 is formed from for example a surface-emitting LED device having directivity in the vertical direction of the board. A light path 65a of the fourth light source 65 intersects the first reflector 42. Outgoing light in the vertical direction of the board from the fourth light source 65 is shielded by means of the first reflector 42. The light is diffused within the housing 37. The diffused light leaks forward from the first auxiliary illumination opening 52.

Figure 5:
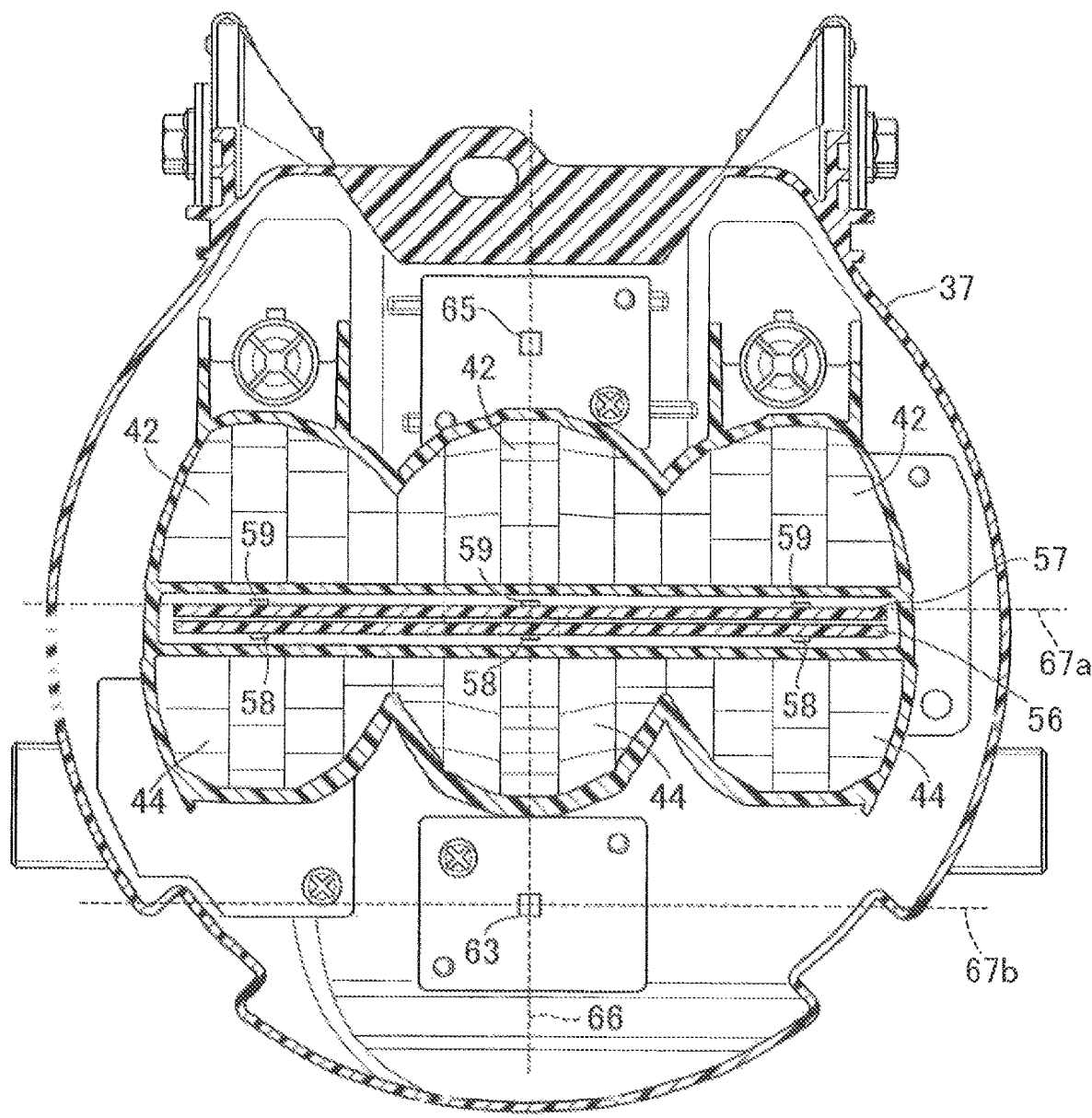
FIG. 5 is a sectional view along line 5-5 in FIG. 4. (first embodiment)

As shown in FIG. 5, in this embodiment three first light sources 58 are mounted on the first board 56. The first light sources 58 are arranged in the vehicle width direction of the vehicle body. The reflecting face of the second reflector 44 is adjusted for each of the first light sources 58. Similarly, three second light sources 59 are mounted on the second board 57. The second light sources 59 are arranged in the vehicle width direction of the vehicle body. The reflecting face of the first reflector 42 is adjusted for each of the second light sources 59. A single third light source (first auxiliary light source) 63 is disposed to the rear of the second reflector 44 corresponding to the middle first light source 58. Similarly, a single fourth light source (second auxiliary light source) 65 is disposed to the rear of the first reflector 42 corresponding to the middle second light source 59.

As is clear from FIG. 5, the second light source 59 and the third light source 63 are disposed on opposite sides of the first light source 58 in the middle when viewed from the front of the headlight device 25, so as to sandwich the first light source 58. No light source for low beam is present in a region partitioned by straight lines 67a and 67b that orthogonally intersect a straight line 66 joining the light source 59 and the third light source 63 and pass through the center of the second light source 59 and the center of the third light source 63.

The third light source 63 is disposed at a position that is on the straight line 66 and is closer to the external shape of the headlight device 25 than the second light source 59 for low beam. Similarly, the fourth light source 65 is disposed at a position that is on the straight line 66 on the side opposite to the third light source 63 and is closer to the external shape of the headlight device 25 than the second light source 59 for low beam.

Figure 6:
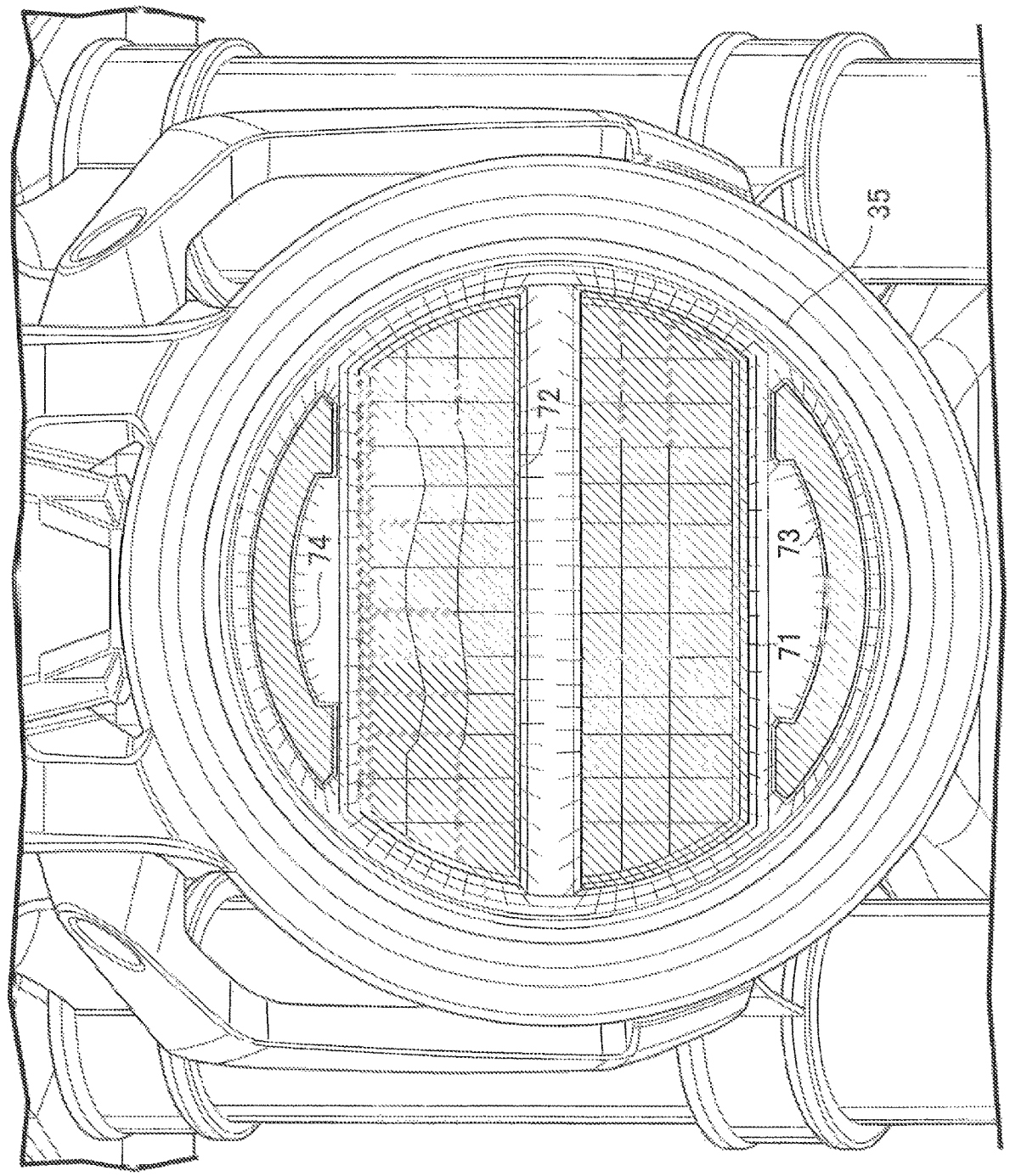
FIG. 6 is a front view of the headlight device schematically showing an illuminated region of the lens when high beam is turned on. (first embodiment)

The operation of the headlight device 25 is now explained. When the headlight device 25 is turned on with high beam, the first light source 58, the second light source 59, the third light source 63 and the fourth light source 65 emit light. Outgoing light from the first light source 58 is reflected from the second reflector 44 and guided to the second illumination opening 45 of the frame 41. As shown in FIG. 6, light emitted from the second illumination opening 45 passes through an illumination range of a first section 71 of the lens 35. Similarly, outgoing light from the second light source 59 is reflected from the first reflector 42 and guided to the first illumination opening 43 of the frame 41. Light emitted from the first illumination opening 43 passes through an illumination range of a second section 72 of the lens 35. Outgoing light from the third light source 63 is shielded by means of the second reflector 44. The shielded light diffuses within the housing 37. The diffused light leaks from the second auxiliary illumination opening 53 of the frame 41. The leaked light passes through an illumination range of a third section 73 of the lens 35. Similarly, outgoing light from the fourth light source 65 is shielded by means of the first reflector 42. The shielded light diffuses within the housing 37. The diffused light leaks from the first auxiliary illumination opening 52 of the frame 41. The leaked light passes through an illumination range of a fourth section 74 of the lens 35. Since the first illumination opening 43, the second illumination opening 45, the first auxiliary illumination opening 52 and the second auxiliary illumination opening 53 define the edge along the annular body 48 of the frame 41, the first to fourth light sources 58, 59, 63 and 65 can establish an illumination range that is close to a circular shape. In this way, the entire headlight can be made to appear bright.

Figure 7:
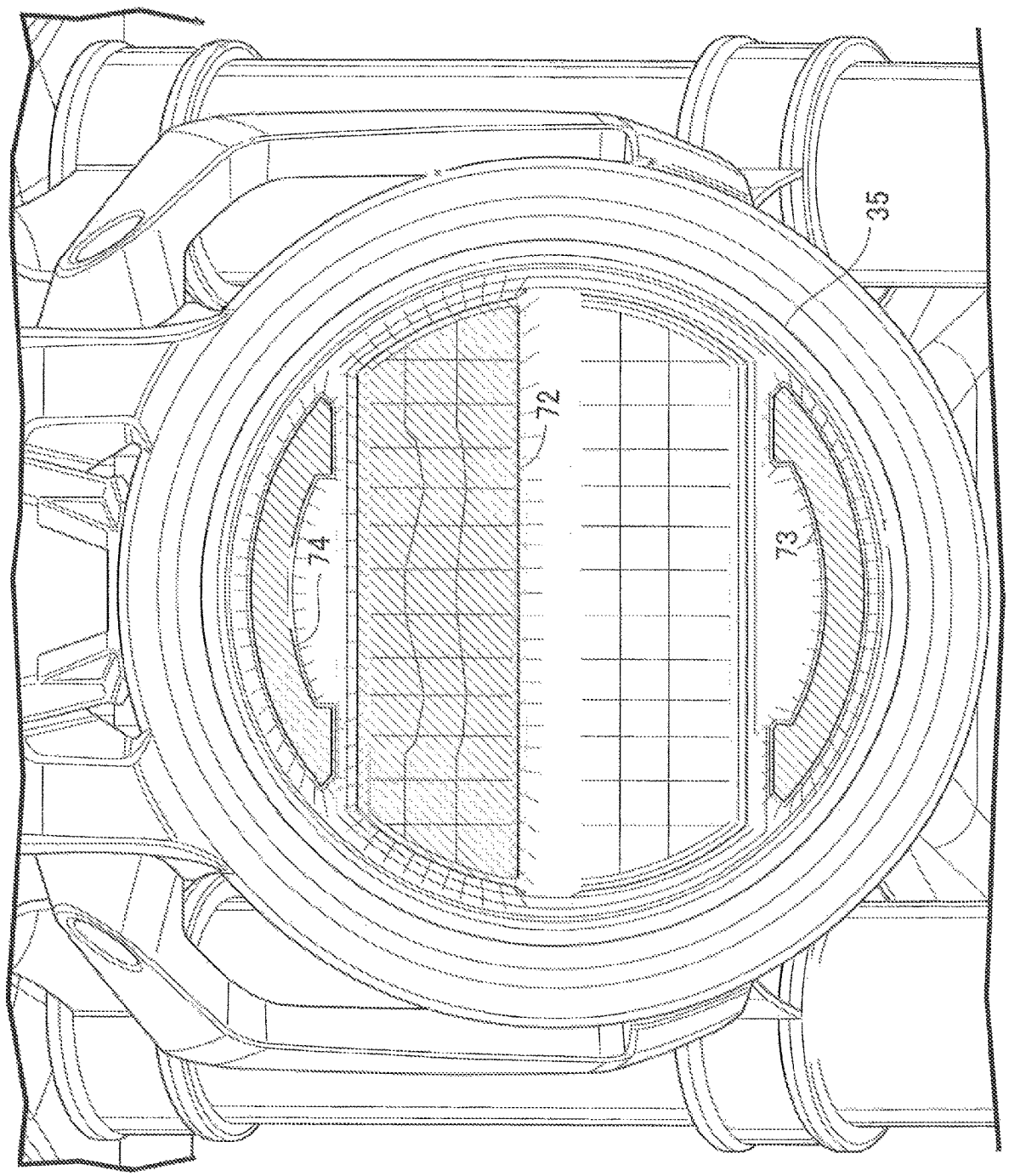
FIG. 7 is a front view of the headlight device schematically showing an illuminated region of the lens when low beam is turned on. (first embodiment)

When the headlight device 25 is turned on with low beam, the second light source 59, the third light source 63 and the fourth light source 65 emit light. As shown in FIG. 7, an illumination range of the second section 72, the third section 73 and the fourth section 74 is established on the surface of the lens 35. Since the illumination range of the third section 73 is isolated by the first section 71 and distant from the illumination range of the second section 72, compared with a case in which light is perceived as a single illumination range, a wide illumination area is ensured for the surface of the lens 35. As wide a range as possible can be perceived as a bright illumination region.

In the present embodiment the second light source 59 and the third light source 63 are disposed on opposite sides of the first light source 58 for high beam so as to sandwich the first light source 58. Even if the first light source 58 for high beam is turned off when low beam is turned on, since the illumination range of the second section 72 and the third section 73 of the lens 35 is ensured by virtue of the operation of the second light source 59 and the third light source 63, the entire headlight can be made to appear bright. In particular, since the third section 73 established by means of the light of the third light source 63 is disposed along the external shape of the headlight device 25, the entire headlight device 25 can be made to appear bright more effectively. Furthermore, since the fourth section 74 established by means of the light of the fourth light source 65 is disposed along the external shape of the headlight device 25 on the side opposite to the third section 73, the entire headlight device 25 can be made to appear bright more effectively.

In the headlight device 25, no light source for low beam is present in a region partitioned by the straight lines 67a and 67b, which orthogonally intersect the straight line 66 joining the second light source 59 and the third light source 63 and pass through the center of the second light source 59 and the center of the third light source 63. Therefore, it is possible to make the entire headlight device 25 appear bright with a smaller number of light sources. Moreover, since a single lens 35 is disposed in common for the first to fourth light sources 58, 59, 63 and 65, it is possible to make a section other than the illuminated part appear bright.

In accordance with the present embodiment, the headlight device 25 includes the frame body 36 supporting the transparent lens 35 while surrounding the outer periphery of the lens 35, the first light source 58 for high beam forming an illumination range of the first section 71 on the surface of the lens 35, the second light source 59 for low beam forming an illumination range of the second section 72 on the surface of the lens 35 at a position deviating from the first section 71, and the third light source 63 forming an illumination range of the third section 73 on the surface of the lens 35 at a position where the first section 71 is disposed between the third section 73 and the second section 72. When the headlight device 25 illuminates with low beam, light passes through the illumination range of the second section 72 and the third section 73 on the surface of the lens 35. Since the illumination range of the third section 73 is isolated by the first section 71 and is distant from the illumination range of the second section 72, compared with a case in which light is perceived in a single illumination range, a wide illumination area is ensured on the surface of the lens 35. As wide a range as possible can be perceived as a bright illumination region.

The invention claimed is:

1. A headlight device comprising:
a first light source for high beam disposed in a middle part of the headlight device in a vehicle width direction;
a second light source for low beam; and
a third light source for low beam,
wherein the second light source and the third light source are disposed on vertically opposite sides of the first light source so as to sandwich the first light source from above and below, and
wherein the device has no light source for low beam, other than the second light source and the third light source, in a region partitioned by straight lines that orthogonally intersect a straight line joining the second light source and the third light source and pass through the center of the second light source and the third light source.

2. The headlight device according to claim 1, wherein an illumination opening via which outgoing light from at least one of the second light source and the third light source is emitted is formed so as to follow an external shape of the headlight device.

3. The headlight device according to claim 2, further comprising:
a fourth light source for low beam; and
an illumination opening via which outgoing light from the fourth light source is emitted, the illumination opening being formed so as to follow the external shape of the headlight device on a side opposite to the third light source.

4. The headlight device according to claim 3, wherein the headlight device has one lens.

5. The headlight device according to claim 2, wherein the headlight device has one lens.

6. The headlight device according to claim 1, wherein the headlight device has one lens.

* * * * *